United States Patent [19]
Likhterov et al.

[11] Patent Number: 6,111,992
[45] Date of Patent: Aug. 29, 2000

[54] REAL-TIME TWO-DIMENSIONAL FILTERING OF VIDEO SIGNALS

[76] Inventors: Boris Likhterov, Giora Ioseftal 15/6; Norman S. Kopeika, Sokolov 36/4, both of Beer Sheva, Israel

[21] Appl. No.: 08/901,427

[22] Filed: Jul. 28, 1997

[51] Int. Cl.[7] .............................. G06K 9/40; G06K 9/54; H04N 1/409; H04N 5/217

[52] U.S. Cl. .......................... 382/260; 382/275; 382/303; 348/241; 358/463

[58] Field of Search ..................................... 382/260, 261, 382/262, 263, 264, 265, 266, 267, 268, 275, 269, 270, 280, 303, 304, 302, 254; 340/720, 733; 364/724.1, 724.05; 348/241; 358/463

[56] References Cited

U.S. PATENT DOCUMENTS

| | | | |
|---|---|---|---|
| 5,410,621 | 4/1995 | Hyatt | 382/260 |
| 5,521,857 | 5/1996 | Ni et al. | 708/814 |

*Primary Examiner*—Scott Rogers

[57] ABSTRACT

A method and device for real time processing of analog signals, such as video signals, representative of frames of data acquired in row order in a two dimensional field. The incoming signal is processed (for example filtered) by analog means, transposed to column order, processed again by analog means, and transposed back to row order. The transpositions are done by digitizing each frame of the signal, transposing the digital signal, and converting the transposed digital signal back to analog form. The process can be pipelined to be accomplished in real time with only a constant delay of two frames.

22 Claims, 6 Drawing Sheets

REAL-TIME TWO-DIMENSIONAL FILTERING OF VIDEO SIGNALS

FIELD AND BACKGROUND OF THE INVENTION

The present invention relates to video processing and, more particularly, to a method and device for real-time two dimensional filtering of video signals.

Video cameras are familiar in their industrial (e.g., commercial television) and consumer (home video) applications. A video camera renders the scene being photographed as a video image, which is an electrical voltage as a function of time. As such, it is a one-dimensional signal that represents the two-dimensional line-scanned scene. The two-dimensionality of the scene is represented in the video image by synchronization pulses, which allow a two-dimensional representation of the scene to be reconstructed from the one-dimensional video image.

Video images suffer from two kinds of distortion. One kind is inherently two-dimensional, associated with factors such as atmospheric blur, image motion, vibration blur and defocusing. The other kind is inherently one-dimensional and includes noise imposed on the video image by the electronic system of the camera. One-dimensional distortions can be suppressed by one-dimensional techniques. Two-dimensional distortions suppression requires two-dimensional techniques.

Because analog techniques operate on the video signal itself, which is inherently one dimensional, the usual approaches to picture enhancement and restoration are digital techniques, include digital signal processing (DSP) and digital filtering. The development of DSP microprocessors has made DSP the method of choice in recent years. Unfortunately, real time DSP requires relatively expensive DSP microprocessors.

Consider, for example, a typical DSP sequence performed on a 512×512 pixel video frame. The sequence includes a forward 2D FFT (3.15 million floating point operations), multiplication by a restoration filter in the transform domain (0.2 million floating point operations), and an inverse 2D FFT (another 3.15 million floating point operations). Adding to this 20% overhead for branches in program execution and 20% overhead associated with parallelization gives a total of about 10 million floating point operations to process one video frame. Convolutional processing generally requires even more operations than FFT processing: a 4×4 convolution of a 512×512 pixel frame requires 8.38 million floating point operations. At a standard rate of 25 frames per second (Europe) or 30 frames per second (USA), this means that a DSP microprocessor must perform at speeds in excess of 250 Mflops just to perform the calculations. If the operations needed to transfer the data to and from the processor are included, it turns out that the processor must perform faster than 400 Mflops if programmed in assembler language and faster than 600 Mflops if programmed in a high level language such as C. Typical moderately priced DSP microprocessors do not achieve these speeds.

DSP has other disadvantages. The millions of floating point operations applied to a single video frame introduce numerical roundoff error. The operation count cited above is for a power-of two FFT. The pixel dimensions of typical video frames often are not powers of two, so either the digitized frames must be padded with zeros or an even slower DFT (Digital Fourier Transform) must be performed. These disadvantages would be obviated if two-dimensional picture enhancement could be done by analog means.

There is thus a widely recognized need for, and it would be highly advantageous to have, an at least partly analog method and device for two-dimensional video picture enhancement.

SUMMARY OF THE INVENTION

According to the present invention there is provided a method of processing a frame of an input analog signal, including the steps of: (a) transposing the frame, thereby producing a transposed analog frame; and (b) analog processing the transposed analog frame, thereby producing a processed analog frame.

According to the present invention there is provided a method of processing successive frames of an input analog signal including the steps of: for each frame of the input analog signal: (a) transposing the frame, thereby producing a transposed analog frame; and (b) analog processing the transposed analog frame, thereby producing a processed analog frame.

According to the present invention there is provided a device for processing successive input frames of an input analog signal including: (a) a first A/D converter for digitizing each of the input frames, thereby producing a first digital frame; (b) a mechanism for transposing each of the first digital frame, thereby producing a first transposed digital frame; (c) a first D/A converter for converting each of the first transposed digital frame to a transposed analog frame; and (d) a mechanism for analog processing of each of the transposed analog frame to a processed analog frame.

Figure 1:
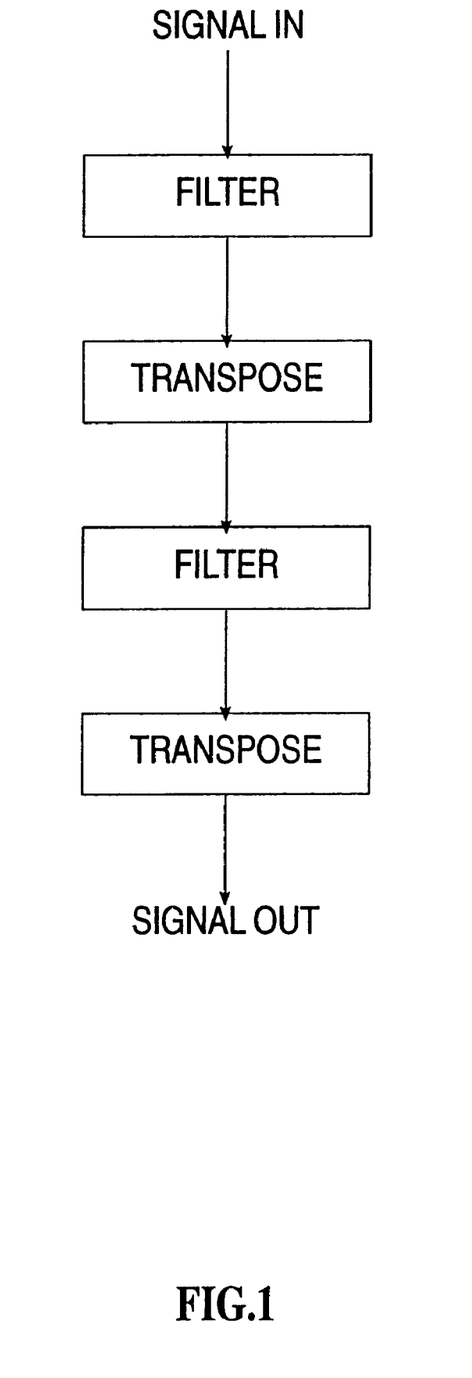
FIG. 1 is a high level block diagram of a general version of the present invention.

The general approach of the present invention is illustrated in the high level block diagram of FIG. 1. Each frame of the incoming video signal, in which the pixels appear in row order, is filtered by an analog filter, transposed to column order, filtered again by an analog filter, and transposed back to row order to give the output video signal. Typically, the two analog filters are identical. As explained below, the transpositions are performed digitally; but digital transposition is much faster than two-dimensional digital filtering. Unlike the digital operations performed in DSP, the operations performed by the present invention on the digitized samples change only the order in which those samples are stored, and not the sample values themselves. Therefore, the only noise added to the signal by the digital portion of the present invention is digitization noise. The noise added by modern analog filters, which have a signal-to-noise ratio better than 80 dB, is negligible.

The scope of the present invention includes two dimensional processing generally of any analog signal that represents frames of data acquired in a two-dimensional field, and includes processing in general that can be realized by analog circuits, not just filtering. Nevertheless, the primary intended application of the present invention is to video processing, and the present invention is described below in terms of video processing.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method and device for processing analog signals, such as video signals, that represent data acquired in a two dimensional field. Specifically, the present invention can be used to filter video signals in real time.

The principles and operation of analog according to the present invention may be better understood with reference to the drawings and the accompanying description.

Figure 2:
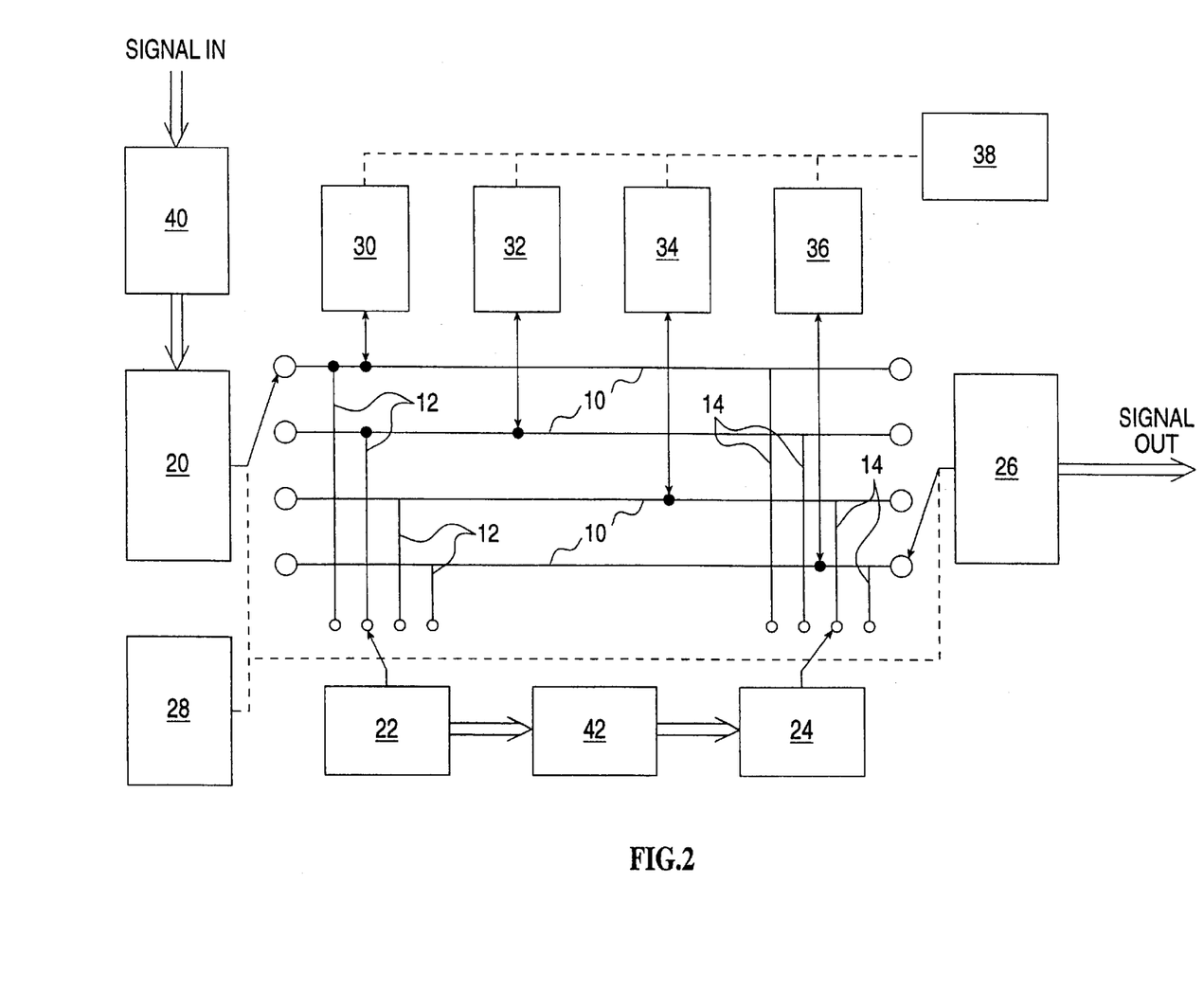
FIG. 2 illustrates a device according to the present invention with a pipelined structure.

Referring now to the drawings, FIG. 2 illustrates a device with a pipelined bus structure for processing successive frames of video signals according to the present invention. In FIG. 2, double solid lines represent the flow of analog signals, single solid lines represent the flow of digital signals, and dashed lines represent control links, as described below. Pipelining is provided via a data flow structure consisting of digital data communications lines 10, 12 and 14 linked as shown by nodes represented by solid circles. A first A/D converter 20 is switchable among four nodes, represented by open circles, of communications lines 10. Similarly, a first D/A converter 22 is switchable among four nodes of communications lines 12; a second A/D converter 24 is switchable among four nodes of communications lines 14, and a second D/A converter 26 is switchable among four other nodes of communications line 10. A/D converter 20 digitizes incoming analog signals and transfers the resulting digital signals to communications lines 10. D/A converter receives digital signals from communications lines 12 and transforms them to analog signals. A/D converter 24 digitizes incoming analog signals and transfers the resulting digital signals to communications lines 14. D/A converter 26 receives digital signals from communications lines 10 and transforms them to analog signals. Switching of A/D converters 20 and 24 and D/A converters 22 and 26 among the nodes of their respective communications lines is controlled by a pipeline control unit 28. Also connected to communications lines 10, as shown, are four memory banks 30, 32, 34 and 36. A scan order control unit 38 operates to transpose data stored in memory units 30, 32, 34 and 36 between row order and column order, as described below. Also shown in FIG. 2 are a first analog filter 40, which receives input video signals, filters the input signals, and passes the filtered signals on to A/D converter 20; and a second analog filter 42, which receives input analog signals from D/A converter 22, filters the signals, and passes the signals on to A/D converter 24.

The operation of the device of FIG. 2 is best understood from a narrative of signal flow through the device of FIG. 2 during the processing of several successive frames of video signals. With the switches of A/D converters 20 and 24 and D/A converters 22 and 26 connected to the nodes of communications lines 10, 12 and 14 as shown in FIG. 2, during the duration of one video frame, the following happens simultaneously:

(a) a first video frame, stored in memory bank 36 in digital form and in row order, is read from memory bank 36 and sent to D/A converter 26, where the first video frame is converted to an output analog signal.

(b) a second video frame, stored in memory bank 32 in digital form and in column order, is read from memory bank 32 and sent to D/A converter 22, where the second video frame is converted to an analog signal. That analog signal is filtered by filter 42 and digitized by A/D converter 24; the resulting digital signal is written to memory bank 34.

(c) a third video frame is input as an input analog signal to filter 40. The resulting filtered analog signal is digitized by A/D converter 20; and the resulting digital signal is written to memory bank 30.

With the second video signal now stored, in digital form and in column order, in memory bank 34, and the third video signal now stored in digital form and in row order, in memory bank 30, the following actions are performed by control units 28 and 38: Scan order control unit 38 transposes the data stored in memory bank 30 from row order to column order, and transposes the data stored in memory bank 34 from column order to row order. Meanwhile, pipeline control unit 28 switches A/D converter 20 to communicate with memory bank 36, switches D/A converter 22 to communicate with memory bank 30, switches A/D converter 24 to communicate with memory unit 32, and switches D/A converter 26 to communicate with memory bank 34. All this is done after the receipt of the third input video frame by filter 40 and before the receipt of a fourth input video frame by filter 40.

As the fourth input video frame is received by filter 40, the following happens:

(a) the second video frame, now in row order, is read from memory bank 34 and sent to D/A converter 26, where the second video frame is converted to an output analog signal.

(b) the third video frame, now in column order, is read from memory bank 30 and sent to D/A converter 22, where the second video frame is converted to an analog signal. That analog signal is filtered by filter 42 and digitized by A/D converter 24; the resulting digital signal is written to memory bank 32.

(c) the fourth video frame is filtered by filter 40 and digitized by A/D converter 20; and the resulting digital signal is written to memory bank 36.

The process continues in like fashion to filter all incoming video frames, with memory banks 30, 32, 34 and 36 being cycled among A/D converters 20 and 24 and D/A converters 22 and 26 in the intervals between successive frames. The processing imposes a uniform delay of two frame durations on the signal. Modern analog video amplifiers impose delays of on the order of 2 nanoseconds on the incoming signals. This is about 4% of the duration of one standard analog video pixel, and therefore is negligible. The read-write cycles of modern memories is on the order of 8 nanoseconds, also considerably shorter than the duration of one standard analog video pixel. The delay imposed by the A/D conversion also is a constant time shift, on the order of several pixel durations, and can be compensated by correct addressing of the digitized pixels in memory.

During the duration of any one video frame, one memory unit receives row order data from A/D converter 20, column order data is sent from another memory unit to D/A converter 22, a third memory unit receives column order data from A/D converter 24, and row order data is sent from the remaining memory unit to D/A converter 26. Then the data newly received from A/D converter 20 is transposed from row order to column order, and the data newly received from A/D converter 24 is transposed from column order to row order. During the receipt of the next video frame, the memory unit from which row order data was sent to D/A converter 26 is used to receive row order data from A/D converter 20; the formerly column order data that was received from A/D converter 24, now being in row order, is sent to D/A converter 26; the memory unit from which column order data was sent to D/A converter 22 is used to receive column order data from A/D converter 24; and the formerly row order data that was received from A/D converter 20, now being in column order, is sent to D/A converter 22.

In an alternative embodiment of the present invention, the fact is exploited that once a memory location has been read from during a given frame duration, the data that was stored in that memory location is no longer needed and may be written over. Therefore, only two memory banks are used in this embodiment. During the duration of any one video frame, one memory bank is used for row order data and the other memory bank is used for column order data. In this embodiment, during the duration of any one video frame, as twice-filtered row order data are read from one of the memory units and sent to D/A converter 26, once-filtered row order data are written from A/D converter 20 to the memory locations thus made available; and as once-filtered column-order data are read from the other memory unit and sent to D/A converter 22, twice-filtered column order data are written from A/D converter 24 to the memory locations thus made available.

Figure 3:
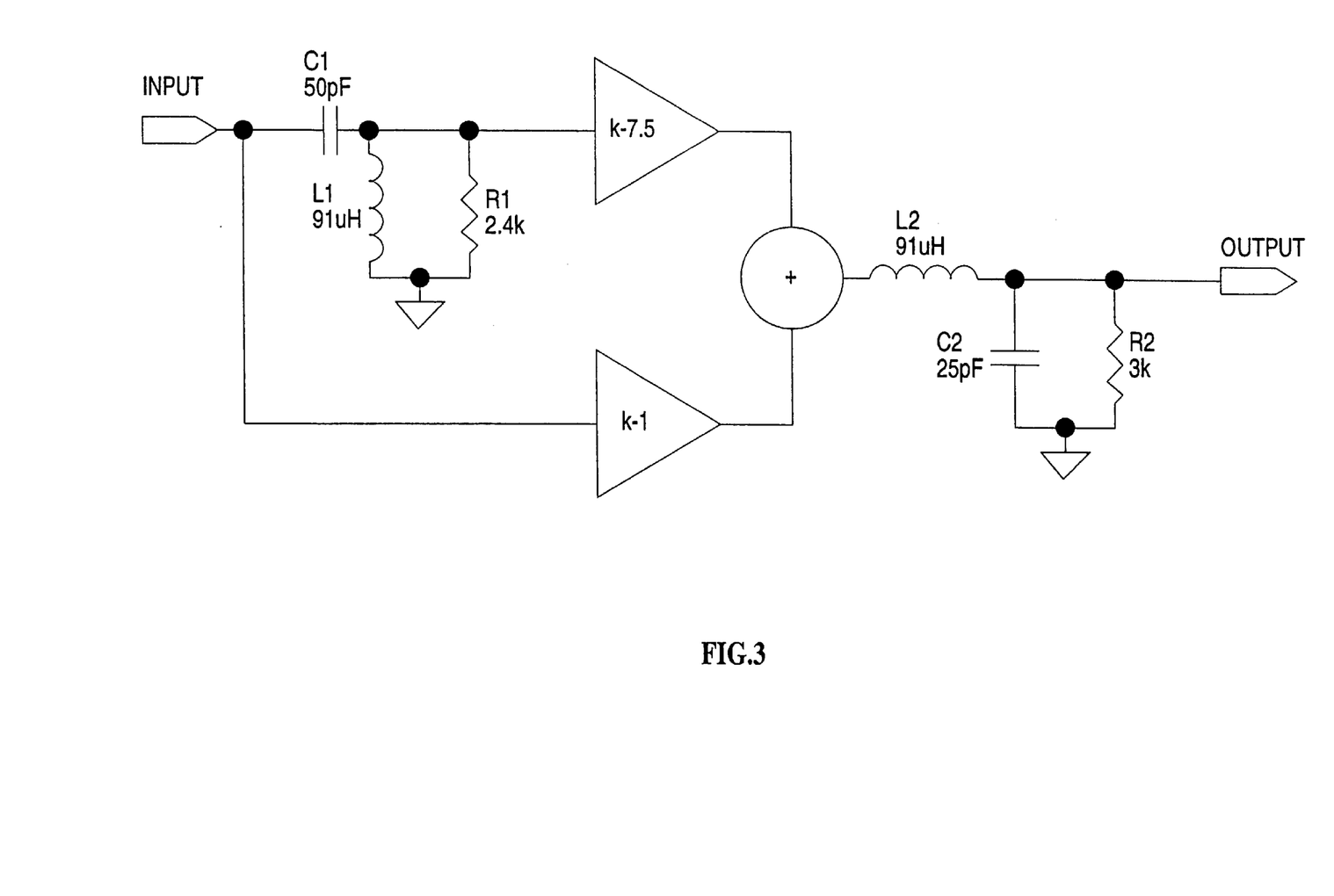
FIG. 3 is a circuit diagram of a realization of the filters of FIG. 2.
Figure 4:
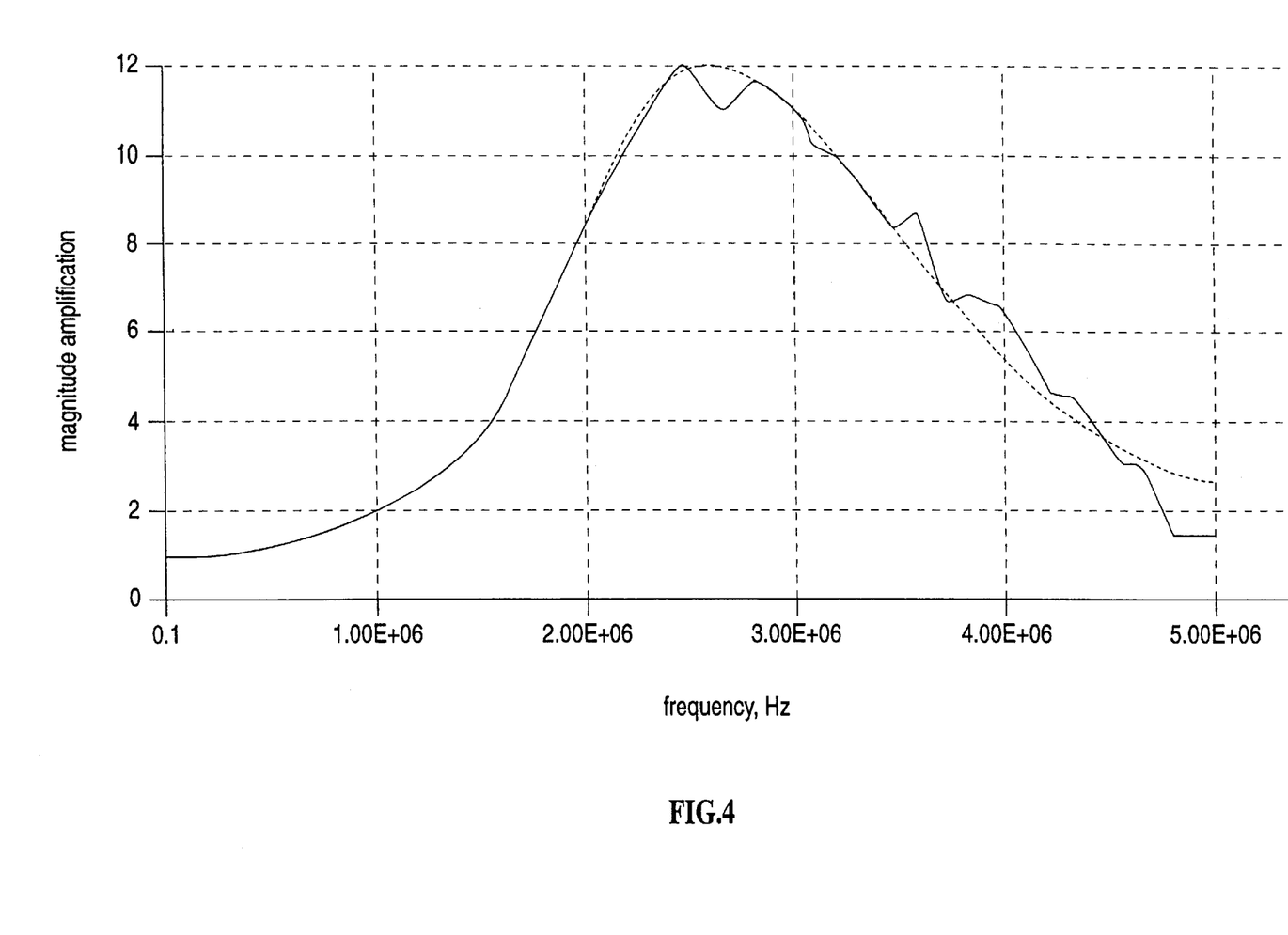
FIG. 4 shows the frequency response of the filter of FIG. 3.

FIG. 3 shows one realization of analog filters 40 and 42. The corresponding frequency response is shown as the solid line in FIG. 4. This solid line approximates within 95% the Improved Atmospheric Weiner Filter of Sadot et al. (I. D. Sadot, A. Rosenfeld, G. Shuker and N. S. Kopeika, "High-resolution restoration of images distorted by the atmosphere, based on an average atmospheric modulation transfer function", *Optical Engineering*, Vol. 34 No. 6 pp. 1799–1807 (June 1995)), which is shown in FIG. 4 as a dashed line. A prototype of a system having the architecture of FIG. 2 and the filters of FIG. 3 has been built for less than one-third the price of comparable digital systems.

One additional advantage of the present invention over DSP is that the present invention can be used to adjust picture quality interactively in real time: the effective gains (k in FIG. 3) of the operational amplifiers of filters 40 and 42 can be changed by adjusting the impedances of the associated feedback loops. The parameters of a DSP system typically can be changed only by reprogramming the system.

Figure 5A:
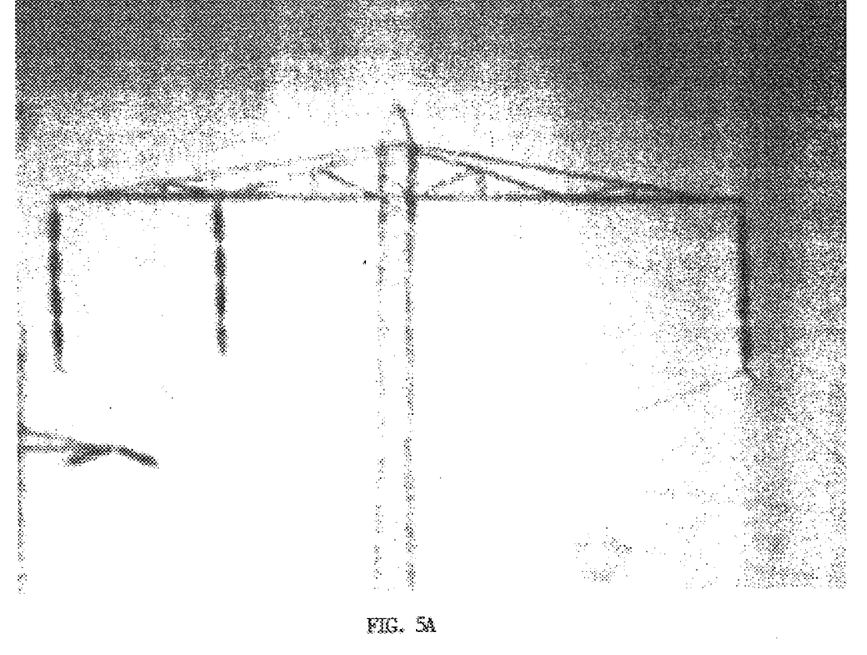
FIG. 5A is an example of an input video frame.
Figure 5B:
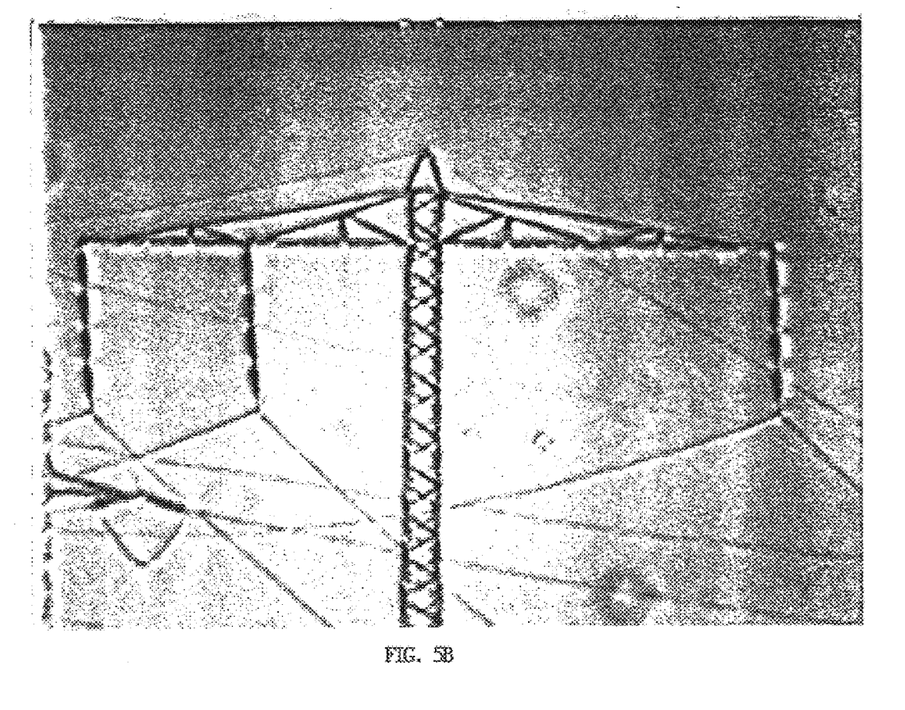
FIG. 5B is an example of an output video frame.

FIGS. 5A and 5B show the results of video processing, using the prototype system mentioned above. The input signal was a standard CCIR video signal from a Pulnix CCD camera model TM-765, with 560×575 pixels/frame resolution, digitized to 570×570 pixels per frame at 12 bit resolution per pixel. The output of the prototype system was connected to a standard video monitor. Another identical monitor was connected directly to the output of the camera. FIG. 5A shows an unprocessed image of an electric power line support tower, taken with an Edmund Scientific 6" telescope from about 3 km away. Image quality is strongly blurred by atmospheric aerosol particles and by turbulence so that almost no wiring is visible. FIG. 5B shows the processed image. All the wiring is clearly visible, and the tower armature structure is much more detailed. The rings over the image are dust particles on the telescope mirror.

The present invention has many potential applications in microscopy, military target acquisition, surface defect detection, and medical surgery. In the latter application, the present invention can enable a physician at a remote location to see the textures and tiny details of a surgical patient's body tissues.

Figure 6:
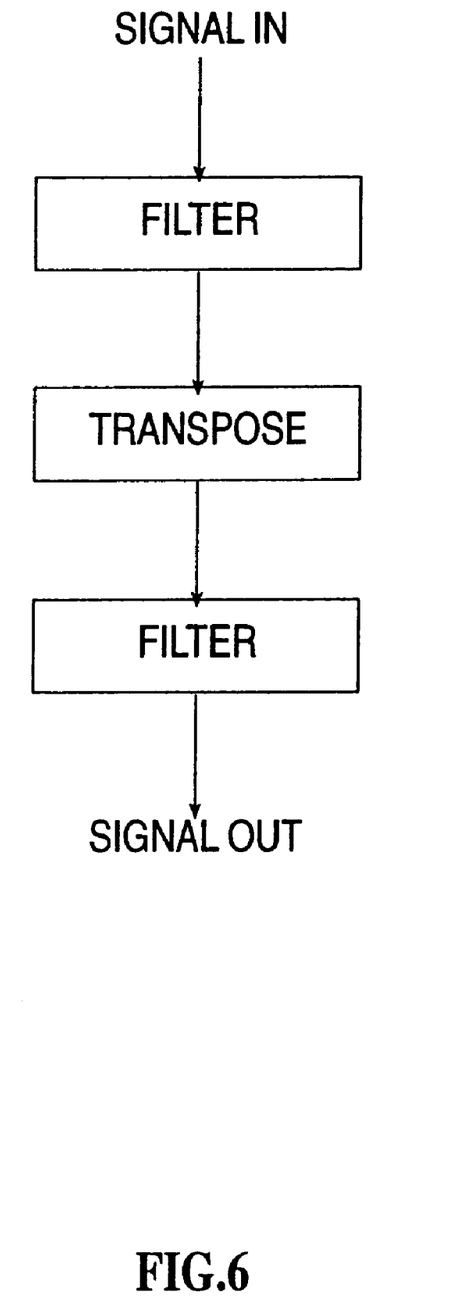
FIG. 6 is a high level block diagram of a simplified version of the present invention.

If the requirements of the application of the present invention are satisfied by a visually distorted (stretched, squeezed, rotated or mirror image) rendition of the scene, then a simplified version of the present invention may be used, as illustrated in the high level block diagram of FIG. 6. FIG. 6 is identical to FIG. 1, except that the last transpose step has been left out. One example of an application for which the output of FIG. 6 is adequate is target acquisition. The advantages of leaving out the last transposition step are that the hardware is simplified and the uniform delay imposed on the signal is only one frame duration.

While the invention has been described with respect to a limited number of embodiments, it will be appreciated that many variations, modifications and other applications of the invention may be made.

What is claimed is:

1. A method of processing a frame of an input analog signal, comprising the steps of:
    (a) transposing the frame by:
        (i) converting the frame to a digital frame;
        (ii) digitally transposing said digital frame thereby producing a transposed digital frame; and
        (iii) converting said transposed digital frame to said transposed analog frame, thereby producing a transposed analog frame; and
    (b) analog processing said transposed analog frame, thereby producing a processed analog frame.

2. The method of claim 1, wherein said analog processing of said transposed analog frame includes filtering.

3. The method of claim 1, further comprising the step of:
    (c) analog processing the frame prior to said transposing of the frame.

4. The method of claim 3, wherein said prior analog processing of the frame includes filtering.

5. The method of claim 1, further comprising the step of:
    (c) transposing said processed analog frame by
        (i) converting said processed analog frame to a digital frame,
        (ii) digitally transposing said digital frame, thereby producing a transposed digital frame, and
        (iii) converting said transposed digital frame to said output analog frame,
    thereby producing an output analog frame.

6. A method of processing successive frames of an input analog signal comprising the steps of:
    for each frame of the input analog signal:
        (a) transposing said frame by:
            (i) converting said frame to a first digital frame,
            (ii) digitally transposing said first digital frame, thereby producing a first transposed digital frame, and
            (iii) converting said first transposed digital frame to said transposed analog frame, thereby producing a transposed analog frame; and
        (b) analog processing said transposed analog frame, thereby producing a processed analog frame.

7. The method of claim 6, wherein said analog processing of said transposed analog frame includes filtering.

8. The method of claim 6, further comprising the step of: for each frame of the input analog signal:
    (c) analog processing said frame prior to said transposing of said frame.

9. The method of claim 8, wherein said prior analog processing of said frame includes filtering.

10. The method of claim 6, further comprising the step of: for each frame of the analog signal:

(c) transposing said processed analog frame by:
  (i) converting said processed analog frame to a second digital frame;
  (ii) digitally transposing said second digital frame, thereby producing a second transposed digital frame; and
  (iii) converting said second transposed digital frame to said output analog frame,
  thereby producing an output analog frame.

11. The method of claim 10, wherein said transposing of said each frame, and said transposing of said processed analog frame produced from a frame immediately preceding said each frame, are effected substantially simultaneously.

12. The method of claim 10, wherein said transposing of said each frame, and said transposing of said processed analog frame produced from a frame immediately preceding said each frame, are effected substantially simultaneously.

13. The method of claim 12, further comprising the steps of:
  (d) writing said first digital frame, produced from said each frame, to a first memory bank;
  (e) reading said first transposed digital frame, produced from a frame immediately preceding said each frame, from a second memory bank;
  (f) writing said second digital frame, produced from said frame immediately preceding said each frame, to a third memory bank; and
  (g) reading said second transposed digital frame, produced from a frame immediately preceding said frame immediately preceding said each frame, from a fourth memory bank.

14. The method of claim 13, wherein said writing of said first digital frame to said first memory bank, said reading of said first transposed digital frame from said second memory bank, said writing of said second digital frame to said third memory bank, and said reading of said second transposed digital frame from said fourth memory bank, are effected substantially simultaneously.

15. The method of claim 12, further comprising the steps of:
  (d) writing said first digital frame, produced from said each frame, to a first memory bank;
  (e) reading said first transposed digital frame, produced from a frame immediately preceding said each frame, from a second memory bank;
  (f) writing said second digital frame, produced from said frame immediately preceding said each frame, to said second memory bank; and
  (g) reading said second transposed digital frame, produced from a frame immediately preceding said frame immediately preceding said each frame, from said first memory bank.

16. A device for processing successive input frames of an input analog signal comprising:
  (a) a first A/D converter for digitizing each of said input frames, thereby producing a first digital frame;
  (b) a mechanism for transposing each of said first digital frame, thereby producing a first transposed digital frame;
  (c) a first D/A converter for converting each of said first transposed digital frame to a transposed analog frame; and
  (d) a mechanism for analog processing of each of said transposed analog frame to a processed analog frame.

17. The device of claim 16, wherein said mechanism for analog processing of each of said transposed analog frame includes a filter.

18. The device of claim 16, further comprising:
  (e) a mechanism for analog processing of the input analog signal prior to said each of said frames being digitized.

19. The device of claim 16, wherein said mechanism for analog processing of the input analog signal includes a filter.

20. The device of claim 16, further comprising:
  (e) a second A/D converter for digitizing each of said processed analog frame, thereby producing a second digital frame;
  (f) a mechanism for transposing each of said second digital frame, thereby producing a second transposed digital frames; and
  (g) a second D/A converter for converting each of said second transposed digital frame to an output analog frame.

21. The device of claim 20, further comprising:
  (h) a plurality of memory banks for storing said first and second digital frames and said first and second transposed digital frames; and
  (i) a mechanism for pipelining said storing.

22. The device of claim 21, having four of said memory banks; and wherein said mechanism for pipelining said storing substantially simultaneously: writes said first digital frame, produced from a third of three successive input frames, to a first of said four memory banks; reads said first transposed digital frame, produced from a second of said three successive input frames, from a second of said four memory banks; writes said second disital frame, produced from said second of said three successive input frames, to a third of said four memory banks; and reads said second transposed digital frame, produced from a first of said four memory banks, from a fourth of said four memory banks.

* * * * *